May 29, 1962

A. WIERZBICKI ET AL 3,036,812

BUTTERFLY VALVES

Filed Nov. 19, 1958

Inventors
Alexander Wierzbicki
Josef J. Haftke
By
Pennie, Edmonds, Morton, Barrows & Taylor
Attorneys

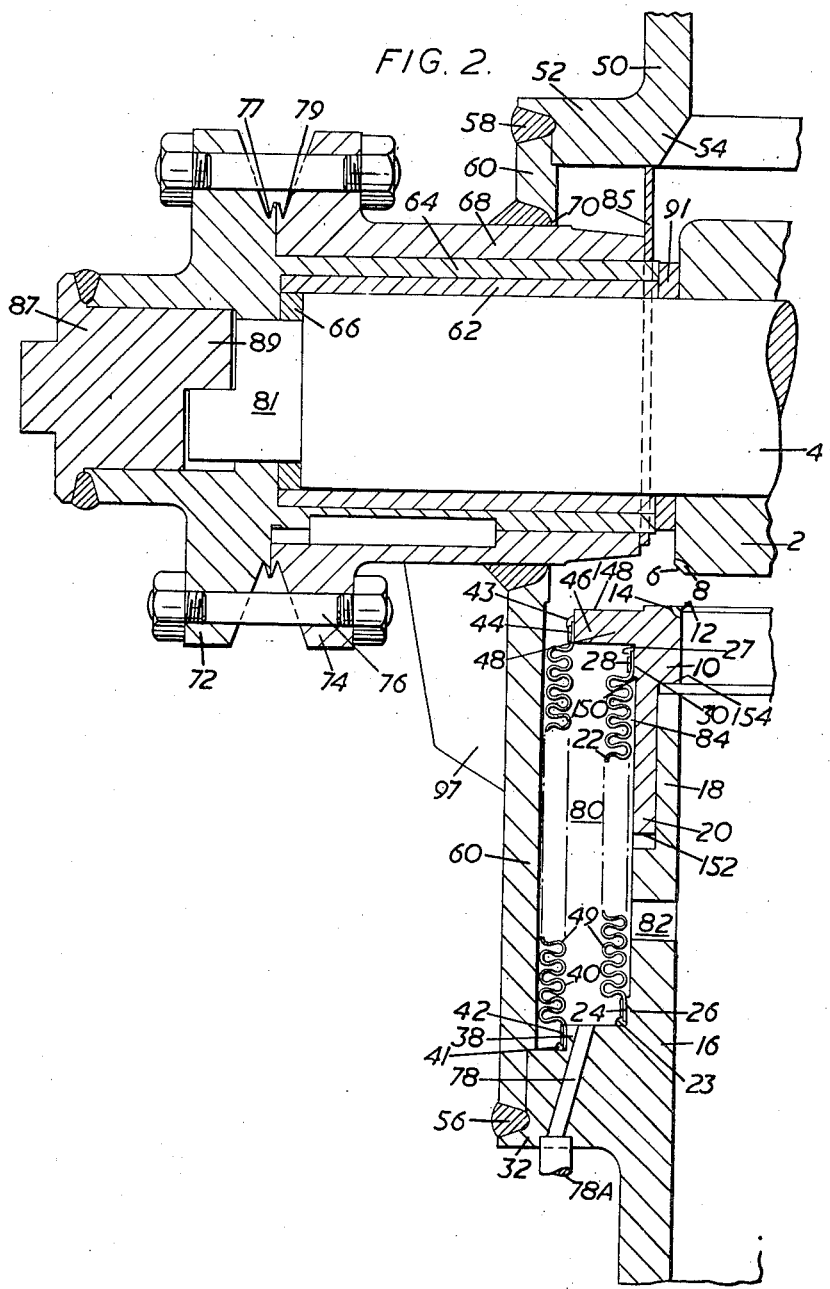

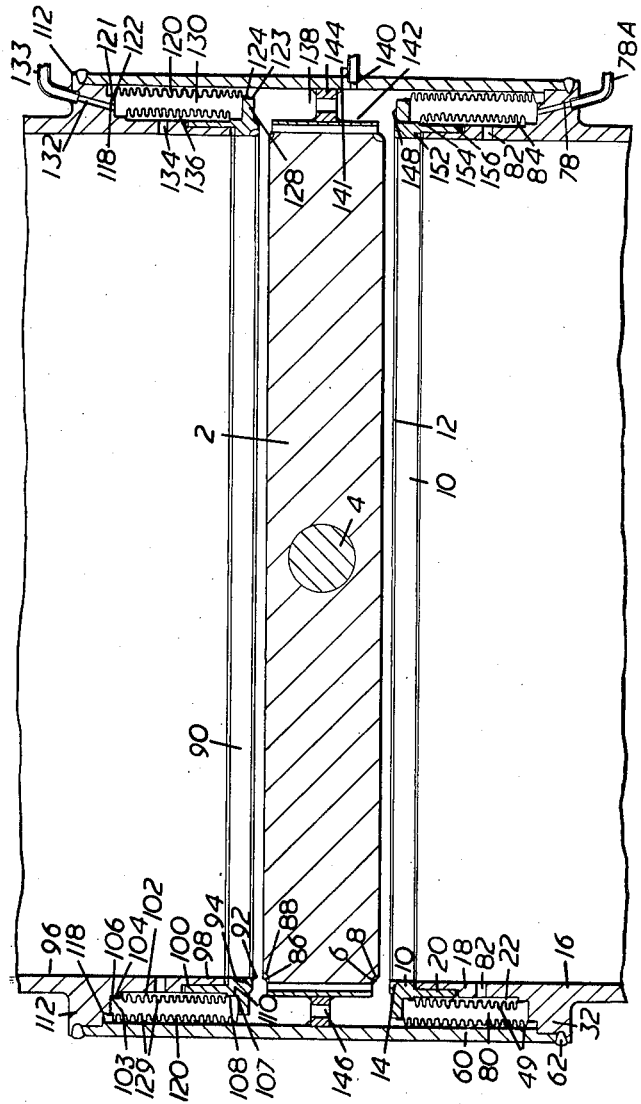

United States Patent Office 3,036,812
Patented May 29, 1962

3,036,812
BUTTERFLY VALVES
Alexander Wierzbicki and Jozef J. Haftke, London, England, assignors to Dewrance & Co. Limited, London, England, a British company
Filed Nov. 19, 1958, Ser. No. 774,919
5 Claims. (Cl. 251—173)

This invention relates to butterfly valves of the kind having a disc rotatable within the valve casing between open and closed positions. In a valve, and particularly in a large diameter valve of this kind controlling a fluid under a high pressure, difficulties are liable to arise in connection with the prevention of leakage past the disc from one side to the other side thereof due to local inaccuracies in machining and deformation of the valve casing and disc under pressure and in connection with the operation of the disc since a tight joint necessitates adequate pressure between an annular surface on the disc and a complementary seating surface and such pressure calls for an operating force which under favourable circumstances is commensurate with the said pressure and the size of the valve and which, if the surfaces tend to bind together, may become inordinately large. In a butterfly valve in which an annular surface on the disc co-operates with a rigid complementary seating surface such that deformation of the disc under fluid pressure results in local relatively high pressures between the disc and the seating surface, the said pressures in the case of a disc which is of large diameter or is exposed to a high pressure difference may be so large as to result in stressing of metal beyond its yield point and consequent jamming of the disc in the closed position when the pressure difference is removed.

It is an object of the present invention to overcome these difficulties either wholly or in part.

In a butterfly valve having a disc rotatable within a valve casing between open and closed positions, according to the present invention the disc is arranged to co-operate with a seating ring formed with an annular seating and movable towards the disc when in the closed position to effect engagement between the seating and a complementary annular surface on the disc and away from the disc when in the closed position to separate the seating from the said annular surface, sealing means being provided between the seating ring and the valve casing.

The invention will now be described, by way of example, with reference to the accompanying, partly diagrammatic drawings, in which:

FIGURE 2 shows a part of FIGURE 1 to an enlarged scale; and

FIGURE 3 is a sectional plan view of an alternative form of a butterfly valve having a disc rotatable within a valve casing and provided with two seating rings adjacent respective faces of the disc.

Figure 1:
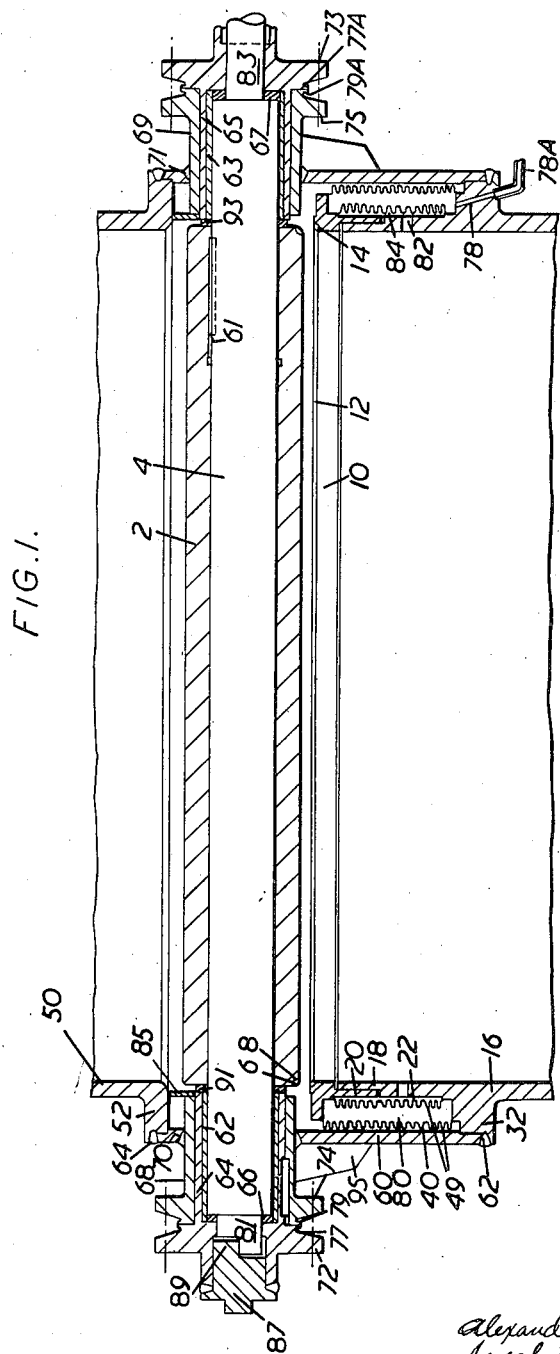
FIGURE 1 is a sectional elevation of a butterfly valve having a disc approximately 5 feet in diameter capable of withstanding a fluid pressure of 250 pounds per square inch absolute and rotatable within a valve casing and provided with a movable seating ring.

Referring to FIGURES 1 and 2 of the drawings, a valve disc 2 is rigidly mounted upon a spindle 4 and is provided with an annular abutment surface 6, formed of hard-facing metal deposited in an annular recess 8 and machined with a frusto-conical surface making a 45° angle with the cone axis. Alternatively the disc 2 is provided with an abutment surface generated by an arc of a circle having its centre at the centre of the disc and on the axis of rotation of the disc. In a further alternative embodiment the abutment surface is flat and is provided on the face of the disc adjacent the seating ring. A seating ring 10 is provided with a co-operating annular seating 12 formed of hard-facing metal deposited in an annular recess 14 and machined to correspond with the annular abutment surface 6.

A tubular member 16 having an end portion 18 of reduced external diameter forms the inlet to the valve. An axial extension 20 of the seating ring 10 of greater internal diameter than the seating ring is adapted to slide upon an end portion 18 of reduced external diameter of the tubular member 16 and thereby axially to position the seating ring 10 in relation to the tubular member 16.

An inner, annular, corrugated, flexible wall 22 is secured by a continuous weld 23 along one reinforced edge 24 thereof to a shoulder 26 formed upon the tubular member 16 and by a continuous weld 27 along the other reinforced edge 28 thereof to a shoulder 30 formed upon the seating ring 10.

An annular projection 32 is provided upon the tubular member 16 and is formed with a shoulder 38. An outer, annular, corrugated, flexible wall 40 is secured by a continuous weld 41 along one reinforced edge 42 thereof to the shoulder 38, and by a second continuous weld 43 along the other reinforced edge 44 thereof to the periphery of a radial extension 48 of the seating ring 10.

The inner and outer flexible walls 22 and 40 co-operate to form a bellows means 49 and enclose a space 80 between the walls.

A tubular member 50 forms the outlet from the valve and is provided with an annular projection 52 at the end 54 thereof. A tubular casing member 60 extends between the two annular projections 32 and 52 and is secured thereto by welds 56 and 58 respectively.

A key 61 locates the disc 2 upon the spindle 4, bearing sleeves 62, 63 supporting the spindle 4, within bearings 64, 65, thrust washers 66, 67, machined to the required thickness on assembly axially locating the spindle 4. The bearings 64, 65 are mounted within housings 68, 69 secured in register with suitable apertures 70, 71 in the tubular casing member 60. The bearings 64, 65 and the housings 68, 69 are formed with suitable flanges 72, 73 and 74, 75 to enable the bearing 64 and the housing 68 and the bearing 65 and the housing 69 to be bolted together by means of bolts such as those indicated at 76 on FIGURE 2 spaced at intervals around the flanges 72, 73 and 74, 75. Welding flanges 77, 77A and 79, 79A are provided upon the bearings 64, 65 and the housings 68, 69 in order that a fluid-tight joint is effected between the bearing 64 and the housing 68 and between the bearing 65 and the housing 69 by means of seal welds.

The spindle 4 is formed with ends 81, 83 of reduced diameter. The end 81 is further machined to leave a portion of semi-circular cross-section. A plug 87 mounted within the bearing 64 is formed with an end portion 89 having the cross-sectional form of a quadrant and co-operates with the end 81 of the spindle 4 to limit the rotation of the spindle to one right-angle.

The end 83 of the spindle 4 extends beyond the housing 69 to co-operate with suitable spindle operating means (not shown), a suitable fluid-tight seal being provided between the spindle and an extension 95 of the housing 69.

Spacing washers 91, 93 machined to the required thickness on assembly, locate the disc 2 axially upon the spindle 4.

Strengthening webs, such as that shown at 97, extend between the housing 68 and the tubular casing member 60.

A passage 78, drilled through the annular projection 32 connects the space 80 between the inner and outer flexible walls 22 and 40 to a pipe 78A which may be connected through valve means (not shown) to a suitable source of high pressure fluid or to exhaust.

Apertures 82 in the tubular member 16 connect the space 84 between the tubular member 16, the axial extension 20 of the seating ring 10 and the inner flexible wall 22 with the interior of the tubular member 16, so that the inner face of the inner flexible wall 22 bounding the space 84 is subjected to the pressure of the fluid in the adjacent tubular member 16.

A short tubular member 85 having an internal diameter somewhat greater than the diameter of the disc 2 and mounted upon the tubular member 50, which at its inlet end has a bevel, tends to preserve the streamline nature of the flow of fluid beyond the seating ring 10 when the disc 2 is in the open position.

In operation, when the valve disc is in its open position, the seating ring 10 occupies the withdrawn position shown on the drawings so that the valve disc 2 may be moved to its closed position shown on the drawings without engaging and, therefore, without impediment from the seating ring 10. When the valve is to be closed, the valve disc is first turned to its closed position and then pressure fluid, a suitable gas under pressure, is admitted to the space 80 so with the result that the seating ring 10 is moved axially of the valve casing and toward the valve disc 2. The annular seating 12 on the seating ring 10, therefore, engages and is forced into closed contact with the complementary annular abutment surface 6 on the disc 2, with the result that a tight or substantially tight joint is made separating the high pressure side and the low pressure side of the valve disc. The joint thus made is maintained in gas-tight or substantially gas-tight condition by maintaining the pressure on the fluid within the space 80.

Furthermore when the valve is closed, and experiences a high pressure on one side of and a low pressure on the other side of the disc 2, the seating ring 10, on the high pressure side, experiences a force, tending to ensure tightness of the joint between the seating ring 10 and the disc 2, due to the pressure difference between the pressure on the low pressure side acting upon the part of the sealing ring exposed to the low pressure, that is to say the face 148, and the fluid pressure at the high pressure side of the disc 2, acting on a part of the surface exposed to the high pressure, that is to say, the annular shoulders 150, 152, 154 of seating ring 10.

When the valve is to be opened, the pressures on both sides of the valve disc 2 are made equal or substantially equal by suitable means. Thus when the valve is installed in a closed, high pressure circuit, and serves to isolate a section of the circuit including a compressor when the disc is in the closed position, in order that access to the compressor may be obtained for inspection purposes and the like, when the inspection has been completed the compressor may be operated to raise the pressure of the fluid in the section to, or substantially to, the pressure of the fluid in the remainder of the circuit. The pressure fluid is then wholly or partly released from the space 80. It will be understood that if the fluid controlled by the valve is at a high pressure it will not be necessary or desirable to release the pressure fluid wholly from the space 80, the inner and outer walls 22 and 40 not being capable of withstanding large pressure differences.

On suitably relieving the force between the abutment surface 6 and the seating 12, the disc 2 can be turned from the closed to the open position.

In the arrangement shown in FIGURE 3, the disc 2 is provided with a second annular abutment surface 86 on the face of the disc remote from the annular surface 6, and formed of hard-facing metal deposited in an annular recess 88 and machined with a frusto-conical surface making a 45° angle with the cone axis. Alternatively the disc 2 is provided with a second annular abutment surface generated by an arc of a circle having its centre at the centre of the disc and lying on the axis of rotation. In a further alternative embodiment the abutment surface is flat and is provided on the face of the disc 2. A second seating ring 90 is provided with a co-operating annular seating 92 formed of hard-facing metal deposited in an annular recess 94 and machined to correspond with the annular abutment surface 86.

A tubular member 96 having an end portion 98 of reduced external diameter forms the valve. An axial extension 100 of the second seating ring 90 of greater internal diameter than the seating ring is adapted to slide upon the end portion 98 of reduced external diameter of the tubular member 96 and thereby axially position the seating ring 90 in relation to the tubular member 96.

An inner, annular, corrugated, flexible wall 102 is secured by a continuous weld 103 along reinforced edge 104 to a shoulder 106 formed upon the tubular member 96 and by a continuous weld 107 along the other reinforced edge 108 thereof to a shoulder 110 formed upon the seating ring 90.

An annular projection 112 is provided upon the tubular member 96 and is formed with a shoulder 118 locating the tubular member 96 within the outer tubular casing member 60. An outer, annular, corrugated, flexible wall 120 is secured by a continuous weld 121 along one reinforced edge 122 thereof to the shoulder 118, and by a second continuous weld 123 along the other reinforced edge 124 thereof to the periphery of a radial extension 128 of the seating ring 90.

The inner and outer flexible walls 102 and 120 cooperate to form a bellows means 129 and enclose a space 130 between the walls.

A passage 132, drilled through the annular projection 112 connects the space 130 to a pipe 133 which may be connected through valve means (not shown) to a suitable source of high pressure fluid, or to exhaust.

Apertures 134 in the tubular member 96 connect the space 136 between the tubular member 96, the axial extension 100 of the seating ring 90 and the inner flexible wall 102 with the interior of the tubular member 96, so that the inner face of the inner flexible wall 102 bounding the space 136 is subjected to the pressure of the fluid in the adjacent tubular member 96.

Between the seating rings 10, 90, the edge of the disc 2 and the tubular casing member 60 an annular space 138 is formed. A port 140 connects the space 138 to a pipe 141 which may be connected through a three-way valve (not shown) alternatively with a source of fluid at high pressure, an exhausting pump and atmosphere.

A short tubular member 142 having an internal diameter somewhat greater than the diameter of the disc 2 concentric with the disc when the disc is in the closed position and secured to an annular mounting ring 144 welded to the casing 60 tends to preserve the streamline nature of the flow of fluid past the seating rings 10 and 90 when the disc 2 is in the open position. Ports, such as those indicated at 146, spaced around the annular mounting ring 144 ensure that the fluid pressures on either side of the ring 144 are substantially equal.

When the valve disc 2 is in its open position, the seating rings 10, 90 occupy respective withdrawn positions so that the valve disc 2 may be moved to its closed position in which it is shown without engaging and, therefore, without impediment from the seating rings 10, 90. When the valve is to be closed, the valve disc 2 is first turned to its closed position and then pressure fluid, suitably a gas under pressure, is admitted to the respective spaces 80, 130 enclosed by the bellows means 49, 129, with the result that the seating rings 10, 90 are moved axially of the tubular casing member 60 and towards one another and the valve disc 2. The annular seatings 12, 92 on the seating rings, 10, 90, therefore, engage and are forced into close contact with the respective complementary annular surfaces 6, 86 on the disc 2 with the result that two tight or substantially tight joints are made separating the high pressure side and the low pressure side of the valve disc. The joints thus made are maintained in gas-tight condition by maintaining a suitable fluid pressure within the spaces 80, 130. When the disc is in the closed position and the fluid pressure on one side of the disc is reduced, it may be necessary to reduce the fluid pressure within the bellows means on that side of the disc in order to avoid collapse of the bellows means should the flexible walls not be capable of withstanding the pressure difference.

When the valve is closed, and experiences a high pressure on one side of the disc and a low pressure on the other side of the disc, should a leakage of high pressure fluid occur past that seating ring 90 on the high pressure side to the low pressure side, then that seating ring 10 on the high pressure side experiences a force, tending to ensure tightness of the joint between the seating ring 10 and the disc 2, due to the pressure difference between the pressure in the annular space 138 between the two seating rings 10, 90, acting on one face 148 of the said seating ring 10, and the fluid pressure at the high pressure side of the disc 2, acting on the annular shoulders 150, 152, 154 on the opposite side of the said seating ring 10.

Further, the space 138 may be connected to atmosphere or an exhausting pump (not shown) through the pipe 141, in order that the fluid pressure within the space 138 may be reduced to a pressure lower than the fluid pressure acting on the low pressure side of the disc 2, thereby producing a pressure differential across both of the seating rings 10, 90 tending to maintain the joints gas-tight or substantially gas-tight. Should there be any leakage between the annular seating surface of a seating ring and the complementary annular surface of the disc 2, the leakage fluid may be evacuated from the space 138 between the seating rings 10, 90 by means of the passage 140 and three-way valve. The inner, flexible, corrugated walls 22, 102 associated with the seating rings 10, 90 form a seal effectively preventing leakage around and past the seating rings 10, 90.

When the valve is to be opened, the pressures on both sides of the valve disc are made equal or substantially equal by suitable means. Thus when the valve is installed in a closed, high-pressure circuit, and serves to isolate a section of the circuit including a compressor when the disc is in the closed position, in order that access to the compressor may be obtained for inspection purposes and the like, when the inspection has been completed the compressor may be operated to raise the pressure of the fluid in that section to, or substantially to, the pressure of the fluid in the remainder of the circuit. The pressure fluid is then wholly or partly released from the spaces 80 and 130. It will be understood that if the fluid controlled by the valve is at a high pressure it will not be necessary or desirable to release the pressure fluid wholly from the spaces 80, 130, the inner and outer walls 22, 102 and 40, 120 not being capable of withstanding large pressure differences. Pressure fluid is then admitted to the annular space 138 between the two seating rings. Each seating ring, therefore, experiences an outward force and the consequent movement separates the co-operating surfaces of the ring and the disc or at least relieves the pressure therebetween. As a result, the disc can then be turned from the closed to the open position.

In the case where it is not practicable to bring both sides of the disc to a common pressure, the space 130 enclosed by the bellows means 129 on that side of the valve subjected to the lower pressure is pressurised to a pressure somewhat higher than the pressure on the high pressure side of the disc 2, the tubular member 96 and the outer tubular casing member 60 serving to support the flexible walls 102, 120 against bursting under the pressure difference. The pressure within the space 80 enclosed by the bellows means 49 is then reduced to a pressure lower than the pressure on the high pressure side of the disc 2 but not lower than a pressure producing a pressure difference across the flexible walls 22, 40 liable to cause collapse thereof. On supplying fluid having a pressure equal to, or slightly higher than, the pressure on the high pressure side of the disc to space 138 the seating ring 10 is forced out of engagement with the disc 2 and the seating ring 90 is biased away from the disc 2. As a result the disc can be eased slightly open and then be turned from the closed to the open position.

It will be understood from the foregoing description that the force between the seating ring and complementary annular surface is controllable by controlling the fluid pressure within the bellows means. Thus, whilst it is possible to exert a force on the seating ring sufficient to produce deformation of the seating ring to correspond with the deformation of the complementary annular surface upon the disc, such force may be kept sufficiently low to avoid the danger of plastic yielding due to inordinately high local pressure between the seating ring and the annular surface.

The provision of an annular, corrugated, flexible wall capable of withstanding a high pressure difference sealing the seating ring to the valve casing has the advantage that any deformation of the valve casing under pressure does not affect the seating ring.

What is claimed is:

1. A butterfly valve including a casing having a central tubular portion, outer tubular portions formed with annular projections coaxially locating the outer tubular portions in relation to the central tubular portion, extensions of the outer tubular portions extending within the central tubular portion and penetrated by radial passages, a spindle extending within and rotatably mounted in relation to said casing, a disc mounted upon said spindle and rotatable between closed and open positions within said casing, said disc being formed on opposite sides with a face, each face being provided with a first annular seating surface, a movable seating ring disposed adjacent each face and slidable upon the extension of the adjacent outer tubular portion formed with a second annular seating surface complementary to the adjacent first annular seating surface, fluid power operating devices including bellows means having inner, annular flexible walls extending adjacent the extensions of the outer tubular portions and outer, annular flexible walls extending adjacent the central tubular portion constituting flexible seals between said casing and each seating ring arranged to move the seating rings and thereby position each second annular seating surface in operative engagement with the adjacent first annular seating surface when the disc is in the closed position, a short tubular member being supported from the central casing member and extending around the periphery of the disc in the closed position and being adapted to preserve the streamline nature of the flow of fluid when the disc is in the open position.

2. A butterfly valve including a casing having a central tubular casing member, outer tubular members formed with annular projections co-axially locating the outer tubular members in relation to the central tubular casing member, an extension of one of the outer tubular members extending within the central tubular casing member and penetrated by radial passages, a spindle extending within and rotatably mounted in relation to said casing, a disc mounted upon said spindle and rotatable between closed and open positions within said casing, said disc being formed with a first annular seating surface, a movable seating ring axially movable within said casing and slidably mounted upon the extension of the outer tubular member, said movable seating ring being formed with a second annular seating surface complementary to the first annular seating surface, and a fluid power operating device including bellows means having an inner, annular flexible wall extending adjacent the extension of the outer tubular member and an outer, annular flexible wall extending adjacent the central tubular casing member constituting a flexible seal between said casing and said seating ring, means arranged to move the seating ring and thereby position the second annular seating surface in operative engagement with the first annular seating surface when the disc is in the closed position, and a short tubular flange member extending from the other outer tubular member being positioned between the periphery of the disc in the closed position and the central casing member and being adapted to preserve the streamline nature of the flow of fluid when the disc is in the open position.

3. A butterfly valve including a casing having a central tubular portion, outer tubular portions formed with annular projections coaxially locating the outer tubular portions in relation to the central tubular portions, extensions of the outer portions extending within the central tubular portion and penetrated by radial passages, a spindle extending within and rotatably mounted in relation to said casing, a disc mounted upon said spindle and rotatable between closed and open positions within said casing, said disc being formed on opposite sides with a face, each face being provided with a first annular seating surface, a movable seating ring disposed adjacent each face axially movable within said casing and slidably mounted on the respective adjacent extension of the respective outer tubular portion formed with a second annular seating surface complementary to the adjacent first annular seating surface, fluid power operating devices including bellows means having inner, annular flexible walls extending adjacent the extensions of the outer tubular portions and outer, annular flexible walls extending adjacent the central tubular portion constituting flexible seals between said casing and each seating ring arranged to move the seating rings and thereby position each second annular seating surface in operative engagement with the adjacent first annular seating surface when the disc is in the closed position.

4. A butterfly valve as claimed in claim 3, in which each face of the disc is provided with a first annular recess, hard facing metal deposited in the recess of each face of the disc to form said first annular seating surfaces, an annular recess formed in each of the seating rings facing the disc, hard facing metal deposited in the annular recesses of said rings forming said second annular seating surface in each ring respectively complementary to the adjacent first annular seating surfaces of the disc.

5. A butterfly valve including a casing having a central tubular portion, outer tubular portions formed with annular projections coaxially locating the outer tubular portions in relation to the central tubular portion, extensions of the outer tubular portions extending within the central tubular portion and penetrated by radial passages, a spindle extending within and rotatably mounted in relation to said casing, a disc mounted upon said spindle and rotatable between closed and open positions within said casing, said disc being formed on opposite sides with a face, each face being provided with a first annular seating surface, a movable seating ring disposed adjacent each face axially movable within said casing and slidably mounted on the respective adjacent extension of the respective outer tubular portion formed with a second annular seating surface complementary to the adjacent first annular seating surface, fluid power operating devices including bellows means having inner, annular flexible walls extending adjacent the extensions of the outer tubular portions and outer, annular flexible walls extending adjacent the central tubular portion constituting flexible seals between said casing and each seating ring arranged to move the seating rings and thereby position each second annular seating surface in operative engagement with the adjacent first annular seating surface when the disc is in the closed position and a passage extending through the central tubular portion of the casing connecting with a source of fluid at variable pressure.

References Cited in the file of this patent

UNITED STATES PATENTS

| | | |
|---|---|---|
| 1,901,961 | Grant | Mar. 21, 1933 |
| 2,442,625 | Thomas | June 1, 1948 |
| 2,789,785 | Woods | Apr. 23, 1957 |
| 2,883,147 | Mirza | Apr. 21, 1959 |
| 2,923,522 | Reppert | Feb. 2, 1960 |

FOREIGN PATENTS

| | | |
|---|---|---|
| 654,449 | Great Britain | June 20, 1951 |
| 674,771 | Great Britain | July 2, 1952 |
| 908,813 | Germany | Apr. 8, 1954 |
| 1,155,199 | France | Nov. 25, 1957 |
| 1,026,587 | Germany | Mar. 20, 1958 |